UNITED STATES PATENT OFFICE.

EADY HART, OF BALLARAT EAST, VICTORIA, AUSTRALIA, ASSIGNOR OF ONE-HALF TO ISABELLA JESSIE STEWART, OF BALLARAT WEST, VICTORIA, AUSTRALIA.

DYESTUFF AND MODE OF PRODUCING IT.

1,399,014.     Specification of Letters Patent.     Patented Dec. 6, 1921.

No Drawing.     Application filed February 16, 1920. Serial No. 359,105.

*To all whom it may concern:*

Be it known that I, EADY HART, a subject of the King of Great Britain and Ireland, etc., residing at Hart Royal, Kline street, Ballarat East, in the State of Victoria, Commonwealth of Australia, have invented certain new and useful Improved Dyestuffs and Mode of Producing Them; and I do hereby declare the following to be a full, clear, and exact description of the invention, such as will enable others skilled in the art to which it appertains to make and use the same.

The object of this invention is to produce new dye-stuffs of high quality at low cost from chromogenic trees, shrubs, or plants, that is any one or more of the following parts—the wood, root, bark, kino, branches as a whole or leaves.

A limited amount of the vegetation indigenous to Australia is known to be usable for making dye with commercial success, though it is known that the resin of the "grass tree", and that the banana fruit and stalk are useful for making dye. My claims however do not cover the use of any vegetation in manner already known.

Myricetin (a glucoside of quercitrin) has been isolated from eucalyptus, but the dye-stuff last-named has not been so produced in a commercial way, so far as I am aware.

As to vegetation of countries outside Australia, a variety of known woods and plants or parts thereof have been used for dye making, but my particular process has not been employed as to such vegetation.

The dye-stuffs I manufacture are applicable to the dyeing of wool, cotton, silk, leather, and other materials; and they will not injure persons who make the dye-stuffs or wear the material dyed, nor will that material be injured. On the contrary it will preserve such strength, softness, and luster, as it had before being dyed. This may be due to the absence of strong acids or the like in carrying out my invention.

Known processes are usable for the application of my dye-stuffs, such as boiling the articles to be dyed in liquid to which the dye-stuff is added, and subsequently rinsing in other suitable liquid; the use of mordant (according to the material to be dyed, and the dye-stuff color) being advisable in some cases—as when other known dyes are used.

In carrying out my process I first prepare a vegetable base by reducing it to small parts or pieces.

The use of wood which has been converted into sawdust, or into small parts by grinding, yields good results; but the reduction of the vegetation may be effected by making shavings, or cutting, chopping or so on.

Such preparation of the vegetation not only causes relatively speedy extraction, but also very thorough extraction, so that the dye-stuffs are produced in relatively large quantities, and therefore economically.

I also prepare an extracting solution. For this purpose a stock solution is preferably prepared, by boiling in water sodium carbonate and unslaked lime, or, more briefly, lime. The proportions I find best are to each gallon of water about 1 lb. of sodium carbonate and about 1 lb. of lime. The term "soda" will be used in the claims to indicate any suitable sodium compound, including washing soda or soda crystals.

When this compound has been well boiled, say for 20 minutes, the resultant liquid is the stock solution. It is to be noted that sodium hydroxid (caustic soda) is not an equivalent or substitute for any ingredient of my solution, and its use is not claimed.

From this stock solution the extracting solution is made by the addition of water. Thus to 100 gallons of water about 10 to 15 gallons of the stock solution is added. This extracting solution may be made if desired, direct from the stated ingredients instead of from a stock solution.

Sediment in the extracting solution or in the stock solution is to be removed before proceeding to use the extracting solution.

To apply the extracting solution the vegetable base to be utilized is boiled, simmered, or heated highly in that solution.

In a case in which with 100 gallons of the extracting solution (containing about 13 lbs. of each ingredient, sodium carbonate and lime) the vegetable base has been added to the extent of 70 lbs. good results have been obtained by boiling for a short time and then by simmering until the color the liquid attains is as desired.

The period of extraction depends on the color of dye-stuff desired, the deeper or stronger the color the longer the period and the greater the proportion of the lime and sodium carbonate to water in the extracting solution, which, as it boils or simmers, extracts coloring matter from the vegetation. With experience it will be found what strength of extracting solutions will best suit any vegetable base.

Altering the proportions of ingredients varies the strength and action of the solution.

An operator will readily find from experience the approximate shade of dye-stuff that will be obtained from a particular vegetable base.

The liquor resulting from the said treatment of vegetation is to be cleared of sediment and solid matter, by filtering or straining, and the filtrate or the like is my dye-stuff in liquid form, but it can be evaporated to a plastic or a solid form for convenient commercial handling.

Vegetable bases which are abundant and cheap, and which have not hitherto been utilized for dye making have been used by me with success. Although vegetation in general not hitherto used for dye-stuff making is suitable for such utilization, and pine wood sawdust yields good pink and brown dye-stuffs by my process, yet I specify in particular my results from the vegetation next enumerated, by the use of my process, the colors of the dye-stuffs obtained being stated. These colors will be obtained in various shades.

Brown dye-stuffs—manufactured by utilizing *Exocarpus cupressiformis* (native cherry).

Brown dye-stuffs—manufactured by utilizing *Acacia harpophylla* (Brigalow).

Yellow, and orange dye-stuffs—manufactured by utilizing *Mallotus discolor* (yellow kamala tree).

Pink and fawn dye-stuffs—manufactured by utilizing a *Casuarina* (shee oak), including *Casuarina equisetifolia*, which extends outside Australia.

Pink dye-stuffs—manufactured by utilizing *Acacia palybotrya*.

Gray dye-stuffs—manufactured by utilizing *Acacia melanoxylon* (blackwood).

Yellow, orange, and red dye-stuffs—manufactured by utilizing *Eucalyptus corymbosa* (bloodwood).

Pink, red and brownish dye-stuffs—manufactured by utilizing *Eucalyptus rostrata* (red gum).

Black, dark brown, and brown dye-stuffs—manufactured by utilizing *Eucalyptus amygdalina* (black peppermint).

Flesh and other pink dye-stuffs—manufactured by utilizing Banksia, for example *Banksia marginata* (pink honeysuckle).

Greenish dye-stuffs—manufactured by utilizing *Aster argophyllus* (musk tree).

Yellow and brown dye-stuffs—manufactured by utilizing *Eucalyptus globulus* (blue gum).

The *Eucalyptus globulus* vegetation aforesaid yields dye-stuff by simmering in my extracting solution; a mixture, with the wood, of bark, and any matter carried by the branches, being optional.

The names appended to the aforesaid botanical designations are vernacular ones commonly employed in Australia.

Having described this invention what is claimed by Letters Patent is:—

1. Improved dye-stuff consisting of the product obtained by the treatment with a solution of sodium carbonate and lime in water, of a chromogenic vegetable substance divided into small parts; substantially as described.

2. Improved dye-stuff consisting of the product obtained by immersing a chromogenic vegetable substance divided into small parts in a solution containing sodium carbonate and lime, boiling the mixture and filtering the resultant liquor.

3. Improved dye-stuff consisting of the filtered resultant obtained by subjecting small portions of a chromogenic vegetable substance reduced to sawdust to a heated solution containing about 9 to 13 lbs. of sodium carbonate and about 9 to 13 lbs. of lime to each 100 gallons of water.

4. Improved dye-stuff consisting of the filtered product obtained by the treatment with a boiling solution of sodium carbonate and lime in water of the vegetable substance botanically known as *Eucalyptus amygdalina*.

5. The process of manufacturing dye-stuff which consists in reducing a chromogenic vegetable substance to the condition of sawdust and treating it in a boiling solution of sodium carbonate and lime, filtering the resultant liquid, and evaporating it.

6. The process of manufacturing dye-stuff which consists in subjecting a chromogenic vegetable substance in a condition of sawdust to a heated solution which contains to every 100 gallons of water about 9 to 13 lbs. of sodium carbonate and about 9 to 13 lbs. of lime.

7. The process of dye-stuff making consisting of treating the vegetable substance botanically known as *Eucalyptus amygdalina* by subjecting the same to a heated solution of sodium carbonate and lime, and then filtering the resultant liquor and evaporating it.

In witness whereof I have hereunto set my hand.

EADY HART.